(12) United States Patent
Ghosh

(10) Patent No.: US 7,457,108 B2
(45) Date of Patent: Nov. 25, 2008

(54) POSITIONING MECHANISM FOR A PEN-BASED COMPUTING SYSTEM

(75) Inventor: Prosenjit Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/895,175

(22) Filed: Aug. 22, 2007

(65) Prior Publication Data

US 2008/0043414 A1     Feb. 21, 2008

Related U.S. Application Data

(62) Division of application No. 10/367,363, filed on Feb. 14, 2003, now Pat. No. 7,280,348.

(51) Int. Cl.
*G06F 1/16* (2006.01)
*G02F 1/1333* (2006.01)
*G06F 3/02* (2006.01)

(52) U.S. Cl. .................. 361/681; 349/58; 349/65; 248/921; 248/923; 345/169; 345/905

(58) Field of Classification Search .................. 361/681; 349/58, 65; 248/917; 345/169, 905
See application file for complete search history.

(56) References Cited

U.S. PATENT DOCUMENTS

| | | |
|---|---|---|
| 3,907,346 A | 9/1975 | Van Klompenburg |
| 5,085,394 A | 2/1992 | Torii |
| 5,255,154 A | 10/1993 | Hosoi et al. |
| 5,297,003 A | 3/1994 | Nomura et al. |
| 5,321,420 A | 6/1994 | Rezek et al. |
| 5,409,275 A | 4/1995 | Yoshida et al. |
| 5,494,447 A | 2/1996 | Zaidan |
| 5,552,957 A | 9/1996 | Brown et al. |
| 5,619,397 A | 4/1997 | Honda et al. |
| 5,819,162 A | 10/1998 | Spann |
| 5,847,924 A | 12/1998 | Youn |
| 5,867,148 A | 2/1999 | Kamimaki et al. |
| 5,887,723 A * | 3/1999 | Myles et al. ............. 206/760 |
| 6,049,813 A | 4/2000 | Danielson |
| 6,068,307 A | 5/2000 | Murphy |
| 6,097,595 A | 8/2000 | Cipolla |
| 6,100,538 A | 8/2000 | Ogawa |
| 6,122,152 A | 9/2000 | Goto et al. |

(Continued)

FOREIGN PATENT DOCUMENTS

JP      04-002935      7/1993

*Primary Examiner*—Jayprakash N Gandhi
*Assistant Examiner*—Zachary M Pape
(74) *Attorney, Agent, or Firm*—Blakely, Sokoloff, Taylor & Zafman LLP

(57) ABSTRACT

In one embodiment, the invention provides a pen-based computing system. The system comprises a tablet unit including a display screen and an electronic assembly housed within an enclosure; and a separate base unit including two panels connected via a hinge, a first one of the panels bearing a keyboard, and a second one of the panels being arcuately displaceable relative to the first panel to prop the tablet unit in a viewing position in which the display screen makes a viewing angle with the keyboard of greater than 90 degrees, wherein the tablet unit and the first panel have complementary formations to prevent sliding movement of the tablet unit relative to the first panel when in the viewing position.

23 Claims, 8 Drawing Sheets

U.S. PATENT DOCUMENTS

| | | |
|---|---|---|
| 6,256,194 B1 | 7/2001 | Choi et al. |
| 6,429,846 B2 | 8/2002 | Rosenberg et al. |
| 6,483,698 B1 | 11/2002 | Loh |
| 6,517,129 B1 | 2/2003 | Chien et al. |
| 6,532,146 B1 | 3/2003 | Duquette |
| 6,563,699 B1 | 5/2003 | Choi |
| 6,653,919 B2 | 11/2003 | Shih-Chung et al. |
| 6,700,775 B1 * | 3/2004 | Chuang et al. .............. 361/680 |
| 6,761,421 B2 | 7/2004 | Chen et al. |
| 6,762,928 B2 | 7/2004 | Lo |
| 6,775,129 B1 | 8/2004 | Ghosh et al. |
| 6,778,196 B2 | 8/2004 | Nakamura |
| 6,780,019 B1 | 8/2004 | Ghosh et al. |
| 6,825,415 B1 | 11/2004 | Chen et al. |
| 6,829,140 B2 | 12/2004 | Shimano et al. |
| 6,840,791 B2 | 1/2005 | Hsiu |
| 6,856,506 B2 * | 2/2005 | Doherty et al. ............. 361/683 |
| 6,870,740 B2 | 3/2005 | Hsu et al. |
| 6,980,423 B2 | 12/2005 | Tanaka et al. |
| 7,239,505 B2 * | 7/2007 | Keely et al. ................. 361/681 |
| 2003/0080949 A1 | 5/2003 | Ditzik |
| 2003/0142469 A1 | 7/2003 | Ponx |
| 2004/0043650 A1 | 3/2004 | Yang et al. |
| 2004/0155861 A1 | 8/2004 | Jackson, III |
| 2004/0190239 A1 | 9/2004 | Weng et al. |
| 2006/0077622 A1 | 4/2006 | Keely et al. |

* cited by examiner

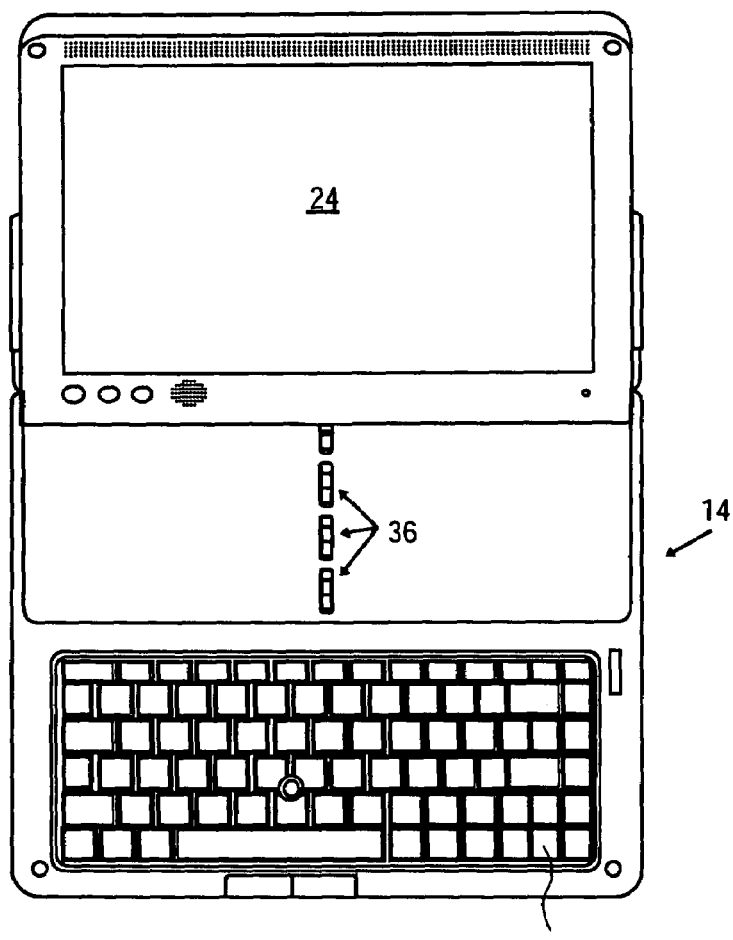
FIG. 5A
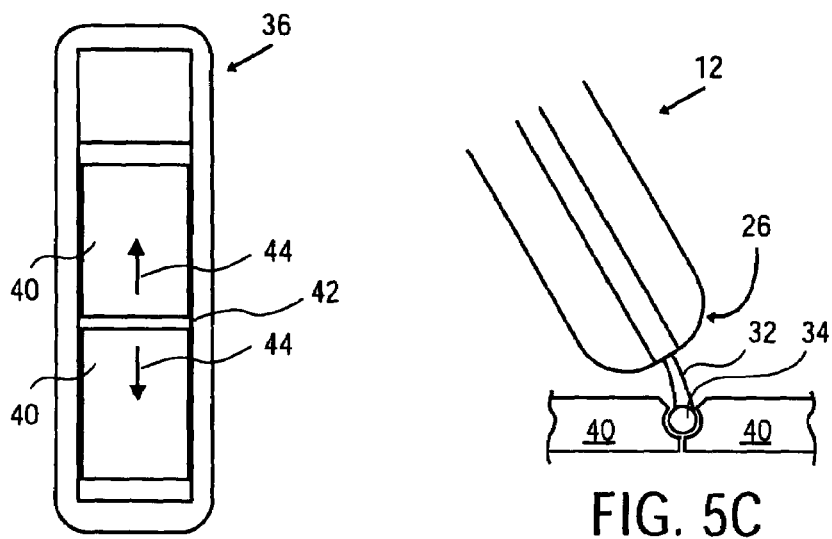
FIG. 5B
FIG. 5C

POSITIONING MECHANISM FOR A PEN-BASED COMPUTING SYSTEM

RELATED APPLICATIONS

The present divisional application is related to, incorporates by reference and hereby claims the priority benefit of the following U.S. Patent Application, assigned to the assignee of the present application: U.S. patent application Ser. No. 10/367,363, filed Feb. 14, 2003 now U.S. Pat. No. 7,280,348.

FIELD OF THE INVENTION

This invention relates to mobile computing devices. In particular it relates to pen-based mobile computing devices.

BACKGROUND

Pen-based computing systems, unlike conventional laptop or notebook computers, allow data input via a stylus or pen. Briefly, a pen is used to write characters on a portion of the display screen that includes a digitizer. The digitizer captures the handwriting and handwriting recognition software converts the software into recognized text.

During data entry using the keyboard, a viewing angle made between the display screen and the keyboard should be greater than 90 degrees for optimal viewing of the display screen.

Thus, there should be some mechanism to hold the display screen relative to the keyboard at the correct viewing angle.

BRIEF DESCRIPTION OF THE DRAWINGS

FIG. 5A shows a top view of the system of FIGS. 1A and 1E, when in the laptop mode configuration;

FIG. 5B shows a complementary formation of a base unit of the system of FIGS. 1A to 1E, in accordance with one embodiment of the invention;

FIG. 5C illustrates how the complementary formation of the base and tablet units cooperate, in accordance with one embodiment;

DETAILED DESCRIPTION

Figure 1:
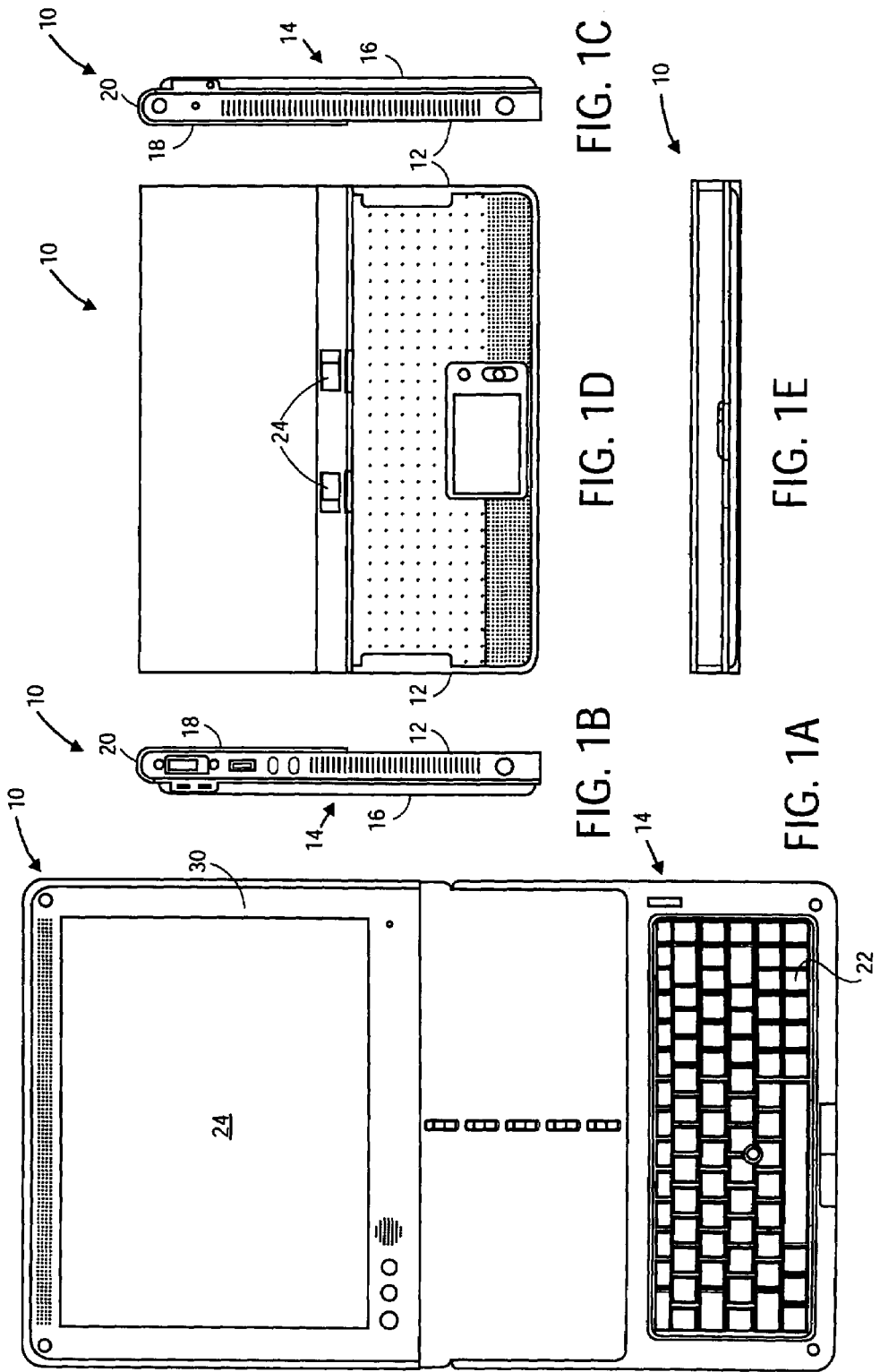
FIGS. 1A to 1E show various view of a computing system, in accordance with one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

FIGS. 1A to 1E show various views of a computing system 10 in accordance with one embodiment of the invention. The system 10 is a pen-based computing system and includes a tablet unit 12 and a base unit 14. The base unit 14 includes first and second generally planar panels 16, 18, respectively. The panels 16, 18 are connected by a flexible hinge 20 which permits relative articulation between the first and second panels 16, 18. The first panel 16 bears a keyboard 22 which permits data entry into the tablet unit 12 when the system 10 is operated in a laptop mode.

As can be seen in FIGS. 1B, 1C, and 1D of the drawings, the system 10 may be positioned in a carry mode configuration, in which the tablet unit 12 is positioned over the first panel 16 with the second panel 18 of the base unit 14 positioned over the tablet unit 12. In order to secure the system 10 in the carry mode configuration, the second panel 18 of the base unit 14 includes two pivotally mounted latches 24 which engage complementary locking formations provided in the tablet unit 12 to releaseably lock the second panel 18 to the tablet unit 12. It will be noted that, in the carry mode configuration, the system 10 resembles a portfolio (see FIG. 1D of the drawings).

Components of the tablet unit 12 typically include one or more processing components, a memory hierarchy comprising a number of memory devices, and a display screen 24 including a digitizer.

Figure 2:
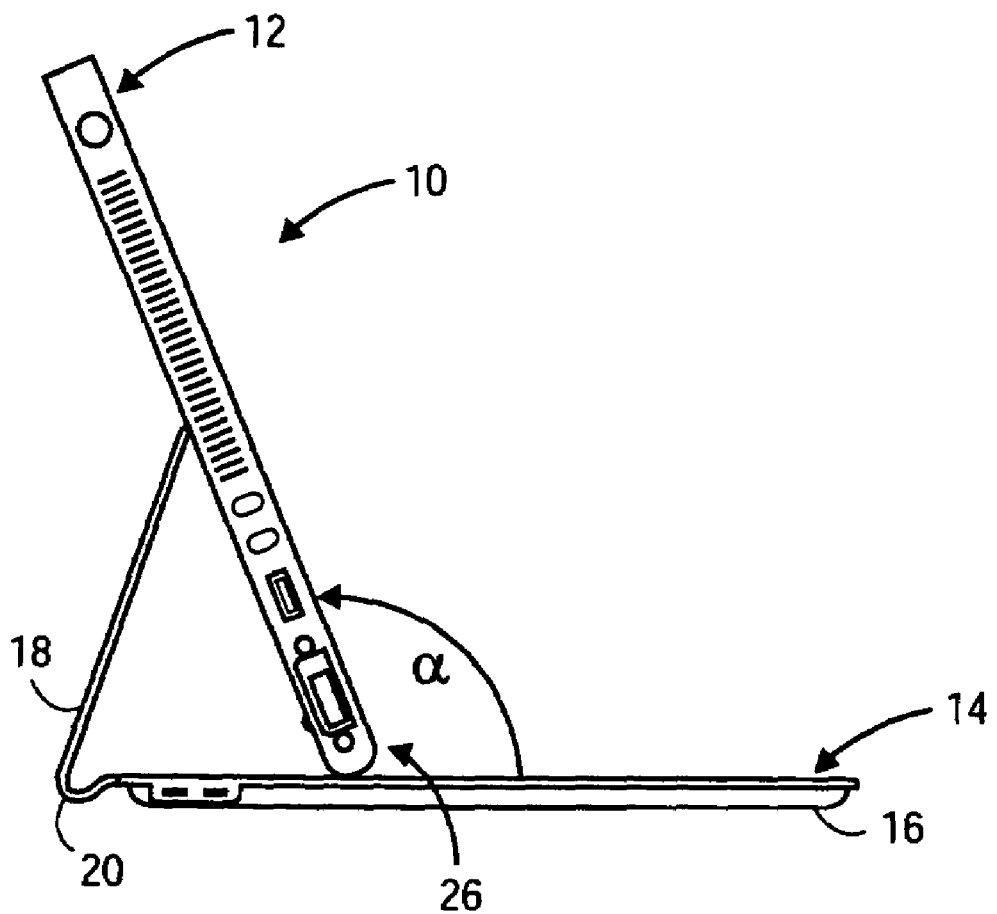
FIG. 2 shows a side view of the system of FIG. 1, when in a laptop mode configuration.

FIG. 2 of the drawings, shows a configuration of the system 10 that is used for data entry via the keyboard 22. This configuration is known as the laptop mode configuration and comprises the tablet unit 12 held at an inclined position relative to the first panel 16 so that the display screen 24 of the tablet unit 12 makes a viewing angle α with the keyboard 22 of greater than 90 degrees. In the laptop mode configuration, the tablet unit 12 is propped by the second panel 18 of the base unit 14 which is releaseably secured thereto via the latches 24 described above.

Figure 3A:
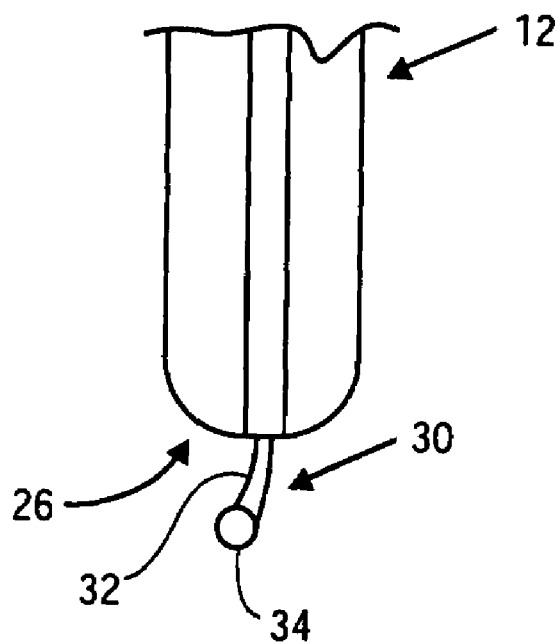
FIGS. 3A and 3B show views of a complementary formation mounted on the tablet unit of the system of FIGS. 1A to 1E to prevent sliding movement of the tablet unit, in accordance with one embodiment of the invention.
Figure 3B:
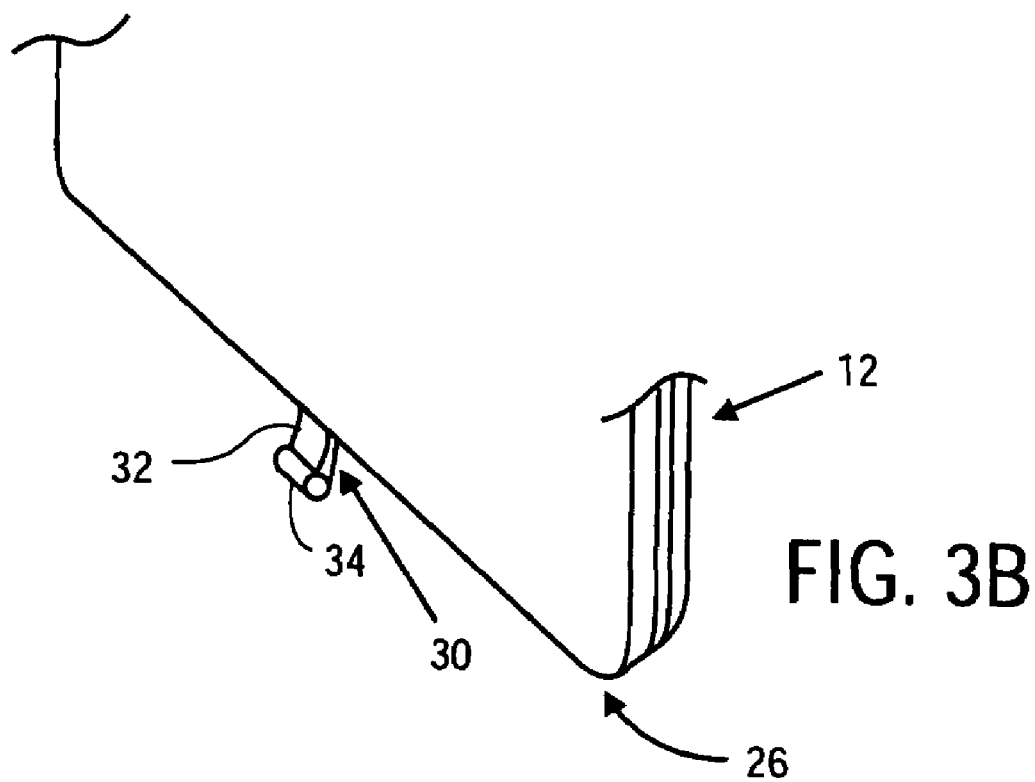
Figure 4A:
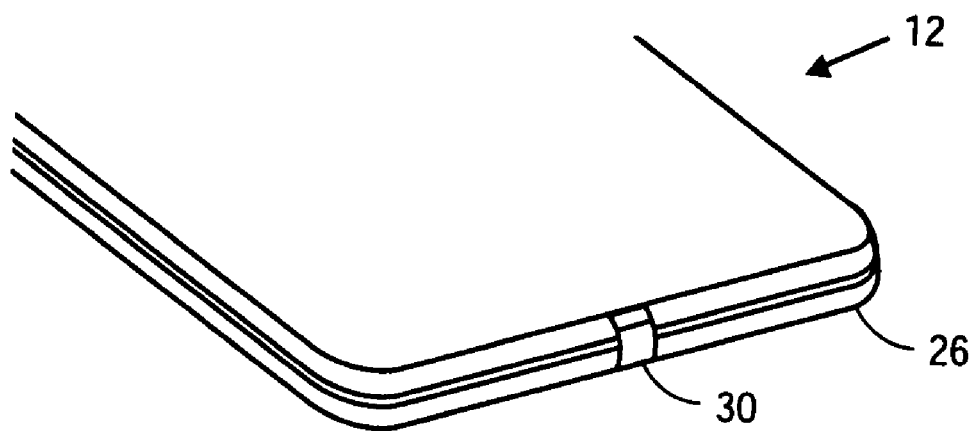
FIG. 4A shows the complementary formation of FIGS. 3A and 3B when in a stowed position.
Figure 4B:
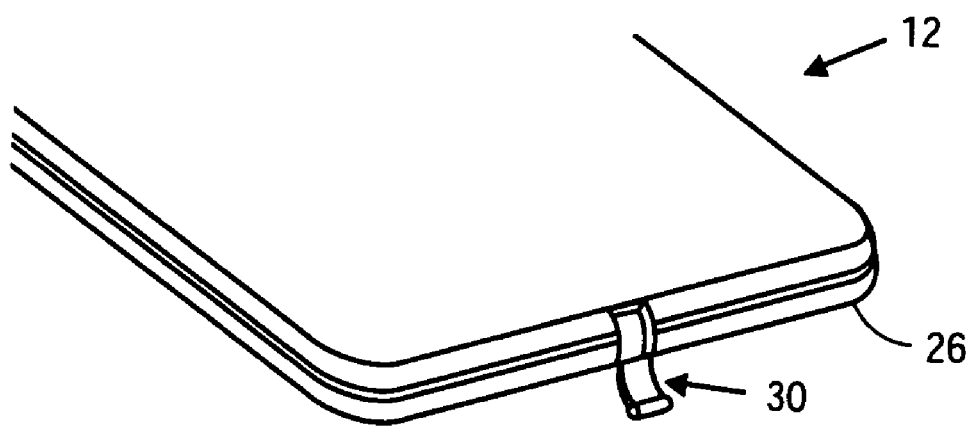
FIG. 4B shows the complementary formation of FIGS. 3A and 3B when in an extended position.

It will be appreciated that when in the laptop mode configuration, a leading edge 26 of the tablet unit 12 has to be arrested to prevent sliding movement thereof relative to the base unit 14. Accordingly, in one embodiment of the present invention, there is provided complementary formations on the tablet unit 12, and the base unit 14, to prevent sliding movement of the tablet unit 12 relative to the first panel 16, when the system 10 is in the laptop mode configuration, as shown in FIG. 2 of the drawings. In one embodiment, as shown in FIGS. 3A and 3B of the drawings, the complementary formations of the tablet unit 12 include a male formation which defines a spigot 30. The spigot 30 is pivotally secured to the tablet unit 12, for example using a transverse pivot pin (not shown) and may be operated to articulate between a stowed position in which it is completely within the housing or enclosure of the tablet unit 12 (see FIG. 4A), and an extended position in which it protrudes from the housing as is shown in FIG. 4B. As can be seen from FIG. 3A of the drawings, the spigot 30 includes a thin neck region 32 and an enlarged head 34.

In order to receive the spigot 30, the base unit 14 includes a complementary female formation shaped and dimensioned to receive the spigot 30 in snug fit therein. As will be seen from FIG. 5A of the drawings, in one embodiment, the base unit 14 includes a plurality of female formations 36 disposed along the longitudinal axis. Each of the female formations 36 may be selectively engaged by a spigot 30 to secure the tablet unit 12 when in the laptop mode configuration. It will be appreciated that the plurality of female formations 36 allows for selection of different viewing angles.

FIG. 5B of the drawings shows one of the female formations 36 of the FIG. 5A in greater detail. As will be seen, the female formation 36 includes two sliding members 40 which are mounted within a recess in the base unit 14 to define a transverse slot 42 within which the spigot 30 is receivable. The sliding members 40 are biased under the influence of a biasing element to close the transverse slot 42 therebetween. In one embodiment, the biasing element may include a coil spring. In use, the spigot 30 urges the sliding members to move in an outward direction indicated by the arrows 44 in FIG. 5B to allow the enlarged head 34 of the spigot 30 to be received in the transverse slot 42. Thereafter, under influence of the biasing force of the biasing elements, the sliding members 40 close behind the enlarged head 34 to bear against the neck 32 of the spigot 30, thus locking the spigot 30 to the female formation 36. In one embodiment, the head 32 of the spigot 30 and the sliding members 40 may be contoured to allow the head 32 to move into the slot 42 with minimal force. For example, the edges of the sliding members 40 adjacent the transverse slot 42 may be inclined to guide the head 34 into the slot 42.

Figure 6A:
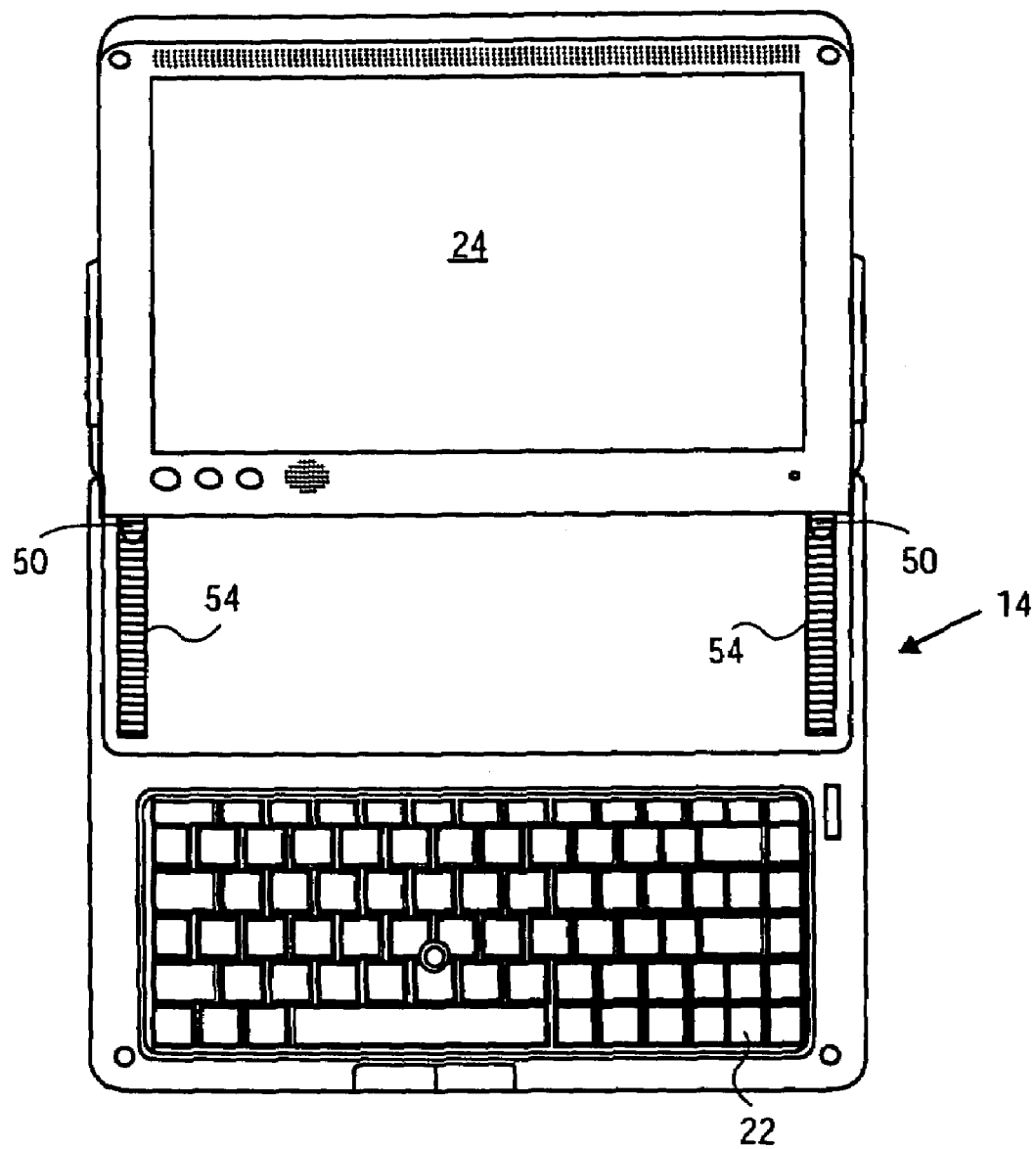
FIG. 6A shows a top plan view of the system of FIGS. 1A to 1E, in the laptop mode configuration in which complementary formations of the base unit, in accordance with another embodiment of the invention, may be seen.
Figure 6B:
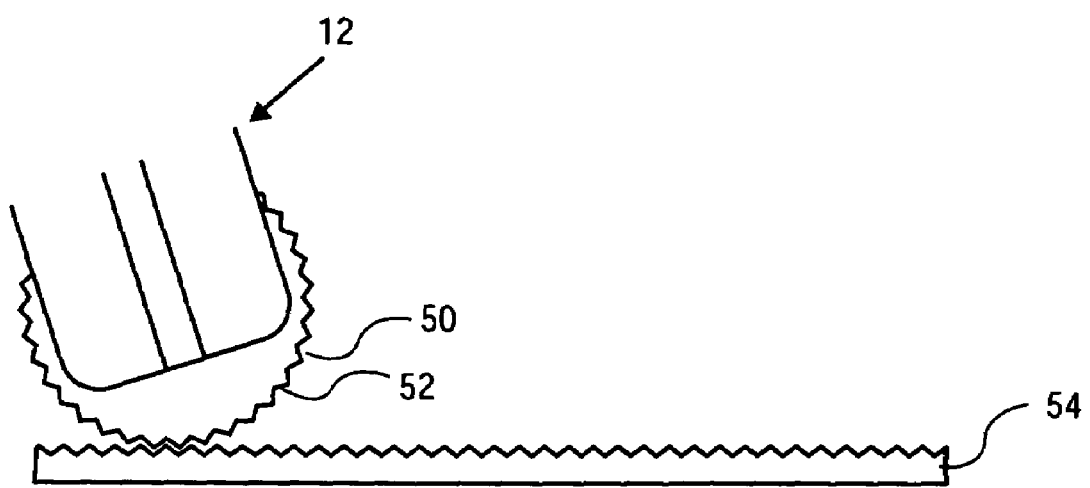
FIG. 6B illustrates the operation of the complementary formation of the embodiment shown in FIG. 6A.

The complementary formations on the tablet unit 12, and the base unit 14, need not be male-female type formations. For example, as can be seen in FIGS. 6A and 6B of the drawings, the complementary formations of the tablet unit 12 may include a rotatable member in the form of a wheel 50 having a plurality of circumferencially spaced teeth 52. In this embodiment, the complementary formations of the base unit 14 may then include an elongate track 54 provided with complementary teeth to engage the teeth 52 of the wheel 50. As can be seen in FIG. 6A of the drawings, in one embodiment, the tablet unit 12 includes two laterally-spaced wheels 50 and the base unit 14 includes two corresponding tracks 54 to receive the wheels 50 therein. Instead of the discrete new angles provided by the embodiment described with reference to FIGS. 5A to 5C of the drawings, the embodiment shown in FIGS. 6A and 6B provide a continuous range of viewing angles each of which is defined by the position of the wheels 50 within the tracks 54.

In an embodiment not shown, in order to prevent sliding movement of the tablet unit 12 relative to the first panel 16 of the base unit 14, the first panel 16 may include a non-slip or high friction surface. Further, portions of the tablet unit that contact the panel 16 when the system 10 is in the desktop mode configuration may include a rough or serrated surface to further prevent sliding of the tablet unit 12 relative to the panel 16.

Figure 7:
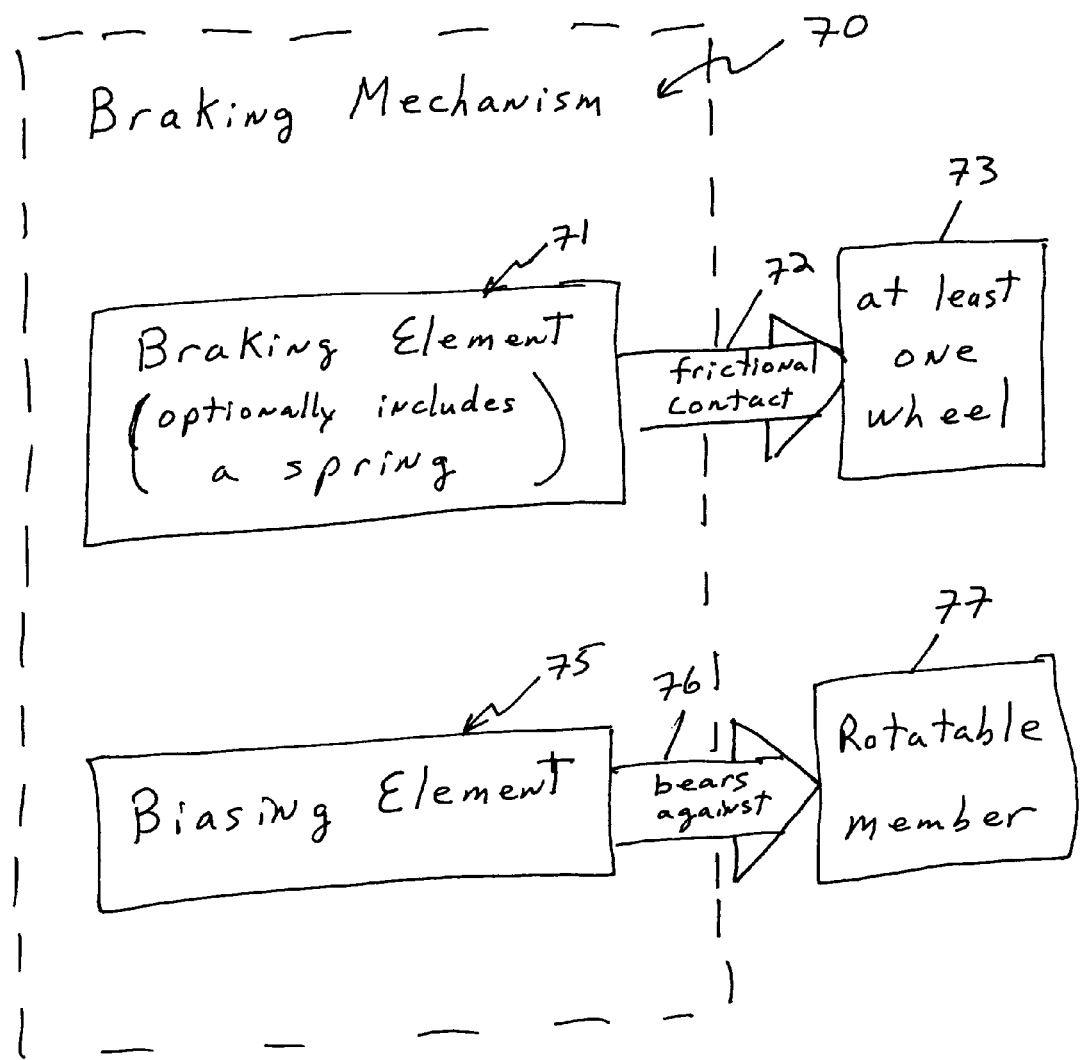
FIG. 7 illustrates embodiments of braking mechanisms to check the free rotation of at least one wheel and/or rotatable member.

In embodiments illustrated in FIG. 7, the tablet unit further comprises a braking mechanism 70 to check the free rotation of at least one wheel 73. In other embodiments also illustrated in FIG. 7, the tablet further comprises a braking mechanism 70 to check free rotation of a rotatable member 77. In some embodiments illustrated in FIG. 7, the braking mechanism 70 may comprise a braking element 71 in frictional contact 72 with the at least one wheel 73. Further, in some embodiments, the braking element 71 may include a spring biased to bear against the at least one wheel 73. In other embodiments, also illustrated in FIG. 7, the braking mechanism may comprise a biasing element 75, which bears against 76 the rotatable member 77 to check free rotation thereof.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A pen-based computing system comprising:
   a tablet unit including a display screen and an electronic assembly housed within an enclosure; and
   a separate base unit including two panels connected via a hinge,
   a first one of the panels bearing a keyboard, and
   a second one of the panels being arcuately displaceable relative to the first panel to prop the tablet unit in a viewing position in which the display screen makes a viewing angle with the keyboard of greater than 90 degrees,
   wherein the tablet unit and the first panel have complementary formations to prevent sliding movement of the tablet unit relative to the first panel when in the viewing position,
   wherein the complementary formation of the tablet unit comprises at least one wheel rotatably mounted to the enclosure of the tablet unit, and
   wherein the complementary formation of the first panel comprises a complementary track.

2. The system of claim 1, wherein each wheel includes a plurality of teeth.

3. The system of claim 1, wherein the tablet unit further comprises a braking mechanism to check the free rotation of the at least one wheel.

4. The system of claim 3, wherein the braking mechanism comprises a braking element in frictional contact with the at least one wheel.

5. The system of claim 4, wherein the braking element includes a spring biased to bear against the at least one wheel.

6. The system of claim 1, wherein the wheel have a plurality of teeth to engage complementary teeth in the track of the first panel.

7. The system of claim 1, further comprising:
   a flexible hinge connecting the first and second panels;
   wherein the second panel comprises a curved portion near the hinge; and
   wherein, when the tablet is in a viewing position and the second panel is in contact with the tablet unit and the bottom of the first panel rests on a planar surface, the curved portion of the second panel lies in the same planar surface as the bottom of the first panel.

8. A pen-based computing system comprising:
   a base unit including a first and second panel connected by a flexible hinge;
   wherein the first panel has a generally flat body including a keyboard, and
   wherein the flexible hinge comprises a curved section extending into the second panel;
   a tablet unit comprising:

a processing component including a processor coupled to a memory;

a display component including a digitizer to capture data entered with the pen and a display screen coupled to the processing component;

an enclosure defining a housing for the processing component and the display component, wherein the enclosure includes a mechanical stop to check sliding motion of the tablet unit relative to the first panel when the tablet unit is supported on the first panel so that it makes an acute angle therewith;

wherein the second panel is in contact with the tablet unit in the said acute angle with the first panel;

wherein the curved section of the hinge is coplanar with the bottom surface of the first panel;

wherein a load from the tablet unit is directed through the second panel to the hinge, wherein the bend in the curved section of the hinge disperses some of the load acting on the hinge away from the first panel, and wherein the mechanical stop comprises a rotatable member, rotatably mounted to the enclosure and shaped and dimensioned to rotate within a complementary track in the base unit.

9. The tablet unit of claim 8, wherein the rotatable member comprises a wheel having a plurality of teeth to engage complementary teeth in the track of the base unit.

10. The tablet unit of claim 8, further comprises a braking mechanism to check free rotation of the rotatable member.

11. The tablet unit of claim 10, wherein the braking mechanism comprises a biasing element, which bears against the rotatable member to check free rotation thereof.

12. The system of claim 8, wherein the second panel is displaceable relative to the first panel to prop the tablet unit in a viewing position in which the display screen makes a viewing angle with the keyboard of greater than 90 degrees.

13. A pen-based computing system comprising:
a tablet unit comprising:
a processing component and a display component including a digitizer to capture data entered with the pen and housed within an enclosure;
a base unit comprising:
a first and second panel connected by a flexible hinge;
wherein the first panel has a generally flat body having a keyboard and at least one longitudinal track complementary to at least one wheel rotatably mounted to the enclosure of the tablet unit, thereby to check sliding motion of the tablet unit relative to the first panel when the tablet unit is supported by the first panel so that it makes an acute angle therewith;
wherein the flexible hinge comprises a curved portion extending into the second panel;
wherein the second panel is in contact with the tablet unit in the said acute angle with the first panel;
wherein the curved section of the hinge is coplanar with the bottom surface of the first panel;

wherein, when in a viewing position, a load from the tablet unit is directed through the second panel to the hinge, wherein the bend in the curved section of the hinge disperses some of the load acting on the hinge away from the first panel.

14. The system of claim 13, wherein each longitudinal track comprises a plurality of teeth to mesh with complementary teeth of each of the wheels rotatably mounted.

15. The system of claim 13, wherein the tablet unit further comprises a braking mechanism to check the free rotation of the at least one wheel.

16. The system of claim 15, wherein the braking mechanism comprises a braking element in frictional contact with the at least one wheel.

17. The system of claim 16, wherein the braking element includes a spring biased to bear against the at least one wheel.

18. A pen-based computing system comprising:
a tablet unit comprising a display screen, a digitizer to capture data entered with the pen and an electronic assembly housed within an enclosure; and
a separate base unit including two panels connected via a hinge positioned at an edge of each of the two panels' coupling points to one another,
a first one of the panels bearing a keyboard, and
a second one of the panels being displaceable relative to the first panel to prop the tablet unit in a viewing position in which the display screen makes a viewing angle with the keyboard of greater than 90 degrees,
wherein the tablet unit and the first panel have complementary formations to prevent sliding movement of the tablet unit relative to the first panel when in the viewing position;
wherein the first panel has a generally flat body including a keyboard and at least one longitudinal track shaped and dimensioned to receive a rotatable member of a tablet unit, whereby the tablet unit is supported by the first panel so that it makes an acute angle therewith;
wherein the hinge is flexible and comprises a curved portion extending into the second panel;
wherein the curved section of the hinge is coplanar with the bottom surface of the first panel.

19. The system of claim 18, wherein the complementary formation of the tablet unit comprises at least one wheel rotatably mounted to the enclosure of the tablet unit.

20. The system of claim 19, wherein each wheel includes a plurality of teeth.

21. The system of claim 19, wherein the tablet unit further comprises a braking mechanism to check the free rotation of the at least one wheel.

22. The system of claim 21, wherein the braking mechanism comprises a braking element in frictional contact with the at least one wheel.

23. The system of claim 22, wherein the braking element includes a spring biased to bear against the at least one wheel.

\* \* \* \* \*